US011068908B1

(12) United States Patent
Wong et al.

(10) Patent No.: US 11,068,908 B1
(45) Date of Patent: Jul. 20, 2021

(54) SKILL-BASED CREDENTIAL VERIFICATION BY A CREDENTIAL VAULT SYSTEM (CVS)

(71) Applicant: Lucas GC Limited, Hong Kong (HK)

(72) Inventors: Wang-Chan Wong, Irvine, CA (US);
Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

(21) Appl. No.: 17/130,158

(22) Filed: Dec. 22, 2020

(51) Int. Cl.
| G06K 9/00 | (2006.01) |
| G06Q 30/00 | (2012.01) |
| G06F 21/32 | (2013.01) |
| G06Q 10/10 | (2012.01) |
| G06Q 50/00 | (2012.01) |
| G06K 9/62 | (2006.01) |
| G06N 3/08 | (2006.01) |
| G06F 16/27 | (2019.01) |
| G06F 40/279 | (2020.01) |
| G06N 3/04 | (2006.01) |

(52) U.S. Cl.
CPC .......... *G06Q 30/018* (2013.01); *G06F 16/27* (2019.01); *G06F 21/32* (2013.01); *G06F 40/279* (2020.01); *G06K 9/00288* (2013.01); *G06K 9/6217* (2013.01); *G06N 3/0445* (2013.01); *G06N 3/08* (2013.01); *G06Q 10/105* (2013.01); *G06Q 50/01* (2013.01)

(58) Field of Classification Search
CPC ........ G06F 16/27; G06F 40/279; G06F 21/32; G06K 9/00288; G06K 9/6217; G06N 3/0445; G06N 3/08; G06Q 10/105; G06Q 50/01
See application file for complete search history.

(56) References Cited

U.S. PATENT DOCUMENTS

2020/0366671 A1* 11/2020 Larson ................ H04L 63/0861

* cited by examiner

*Primary Examiner* — Avinash Yentrapati
(74) *Attorney, Agent, or Firm* — Helen Mao; Imperium Patent Works

(57) ABSTRACT

Methods and systems are provided for skill-based/JHE credential verification using robotic contact and analysis, social media search, and/or peer affirmation within a blockchain-based database that holds verified trustor records. In one embodiment, a credential vault system (CVS) identifies a set of skill-based canonical JHEs for a trustor based on a description of job history and experience (JHE) of the trustor using a recurrent neural network (RNN) model with natural language process/natural language understanding (NLP/NLU), wherein a trustor record in the CVS is uniquely identified by a trustor identification in a blockchain-based database of the CVS, collects one or more corroborations for each canonical JHE by the CVS, evaluates each canonical JHE based on the collected one or more corroborations using a deep learning model to verify the corresponding canonical JHE, and appends each verified canonical JHE to the trustor record in a blockchain-based database of the CVS.

20 Claims, 9 Drawing Sheets

SKILL-BASED CREDENTIAL VERIFICATION BY A CREDENTIAL VAULT SYSTEM (CVS)

TECHNICAL FIELD

The present invention relates generally to credential verification system and, more particularly, a blockchain-based credential vault system.

BACKGROUND

Credential verification is an important process of the hiring process. There is excessive reliance on credentials, such as academic degrees, in determining hiring or promotion policies. There is a looming credential crisis in our society. To understand what the crisis is, we must understand what credentialism and professionalization are. Credentialism is a reliance on formal qualifications or certifications to determine whether someone is permitted to undertake a task, speak as an expert or work in a certain field. Professionalization is the social process by which any trade or occupation is transformed into a true "profession of the highest integrity and competence." This process tends to involve establishing acceptable qualifications, a professional body or association to oversee the conduct of members of the profession and some degree of demarcation of the qualified from unqualified amateurs. This creates "a hierarchical divide between the knowledge-authorities in the professions and a deferential citizenry." This demarcation is often termed "occupational closure", as it means that the profession then becomes closed to entry from outsiders, amateurs and the unqualified: a stratified occupation "defined by professional demarcation and grade.

Credential inflation (aka academic inflation, degree inflation, and credential creep) is the process of inflation of the minimum credentials required for a given job and the simultaneous devaluation of the value of diplomas and degrees. A direct consequence of credential inflation is the rise of professionalization. Credentialism and professionalization are the two gate keepers whom employers rely on to hire the right people. Resume inflation is a generalization of these two types of inflation. It includes false or misleading information on one's resume to make oneself a more attractive candidate for a job. Examples include adding degrees, certificates, awards one never received, or employments and positions one never held.

The best practice is for a company to do their homework prior to making a new hire. This type of due diligence does not start with the interview process; on the contrary, the best method to finding the right employee is to do your research before you grant him or her an initial interview. Of the credential verifications, the job history and experience (JHE) verification is highly time consuming, error-prone, and also easily biased. The traditional JHE items are hard to verify without painstaking efforts. Even so, the results are often not satisfactory.

Improvements and enhancements are required to provide reliable JHE verification methods.

SUMMARY

Methods and systems are provided for skill-based/JHE credential verification using robotic contact and analysis, social media search, and/or peer affirmation within a blockchain-based database that holds verified trustor records. In one embodiment, a credential vault system (CVS) identifies a set of skill-based canonical JHEs for a trustor based on a description of job history and experience (JHE) of the trustor using a recurrent neural network (RNN) model with natural language process/natural language understanding (NLP/NLU), wherein a trustor record in the CVS is uniquely identified by a trustor identification in a blockchain-based database of the CVS, collects one or more corroborations for each canonical JHE by the CVS, evaluates each canonical JHE based on the collected one or more corroborations using a deep learning model to verify the corresponding canonical JHE, and appends each verified canonical JHE to the trustor record in a blockchain-based database of the CVS. In another embodiment, authenticating the trustor involves obtaining a selfie of the trustor alongside an official photo ID, collecting images of the trustor from a social media network, and performing facial recognition of the received selfie with a deep learning model based on the images collected. In one embodiment, the corroborations for each canonical JHE are collected from a social media network. In another embodiment, the CVS further identifies search attributes for each canonical JHE using a deep learning model, identifies trustor-related professional social media resources, and collects the corroborations based on search results of the identified search attributes on the identified social media resources. In another embodiment, the corroborations for each canonical JHE are collected from one or more member trustors in the CVS. In one embodiment, the CVS further identifies a group of member trustors in the CVS based on the trustor record, groupcasts a verification request with information of the trustor to the identified group of member trustors for verification, analyzes one or more responses to the verification request from one or more member trustors, and generates one or more corroborations for one or more corresponding canonical JHE of the trustor. In another embodiment, the evaluating of each canonical JHE generates an evaluation report, and wherein the evaluation report is appended in the blockchain-based database of the CVS. In one embodiment, the CVS further authenticates the trustor before appending the verified canonical JHE to the blockchain-based database of the CVS. In one embodiment, the blockchain-based database comprises a credential vault blockchain and a private interplanetary file system (IPFS). In another embodiment, a canonical JHE report is stored in the private IPFS and an asset ID of the canonical JHE report is appended to the credential vault blockchain.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

The due diligence is a grinding and painful long process that must go over for each new hiring, more so for higher up positions. Ideally, the person who has acquired the credentials should be in-charge of his own credentials. However, most of time, the applicants have to rely on third parties, such as universities or employers, to retain, verify and validate their credentials. Job seekers have to request official transcripts from university registrars and pay fees for each copy of the transcript requested. Employers and universities, still at times, need to call the issuing authority of the certificate if they want to verify the transcripts. It is complicated and tedious, which is one of the major factors for frauds. Making certificates easily verifiable and transferable is one advantage of digital systems. To a job seeker, providing the authenticity of items listed on his resume for a job application can help expedite the due diligence process of hiring process, hence, a better chance for an interview. The credential vault system is advantageous by offering a transparent, immutable, and secured repository to the applicant/trustor and the beneficiary/requestor for verified credentials from the issuer.

Figure 1:
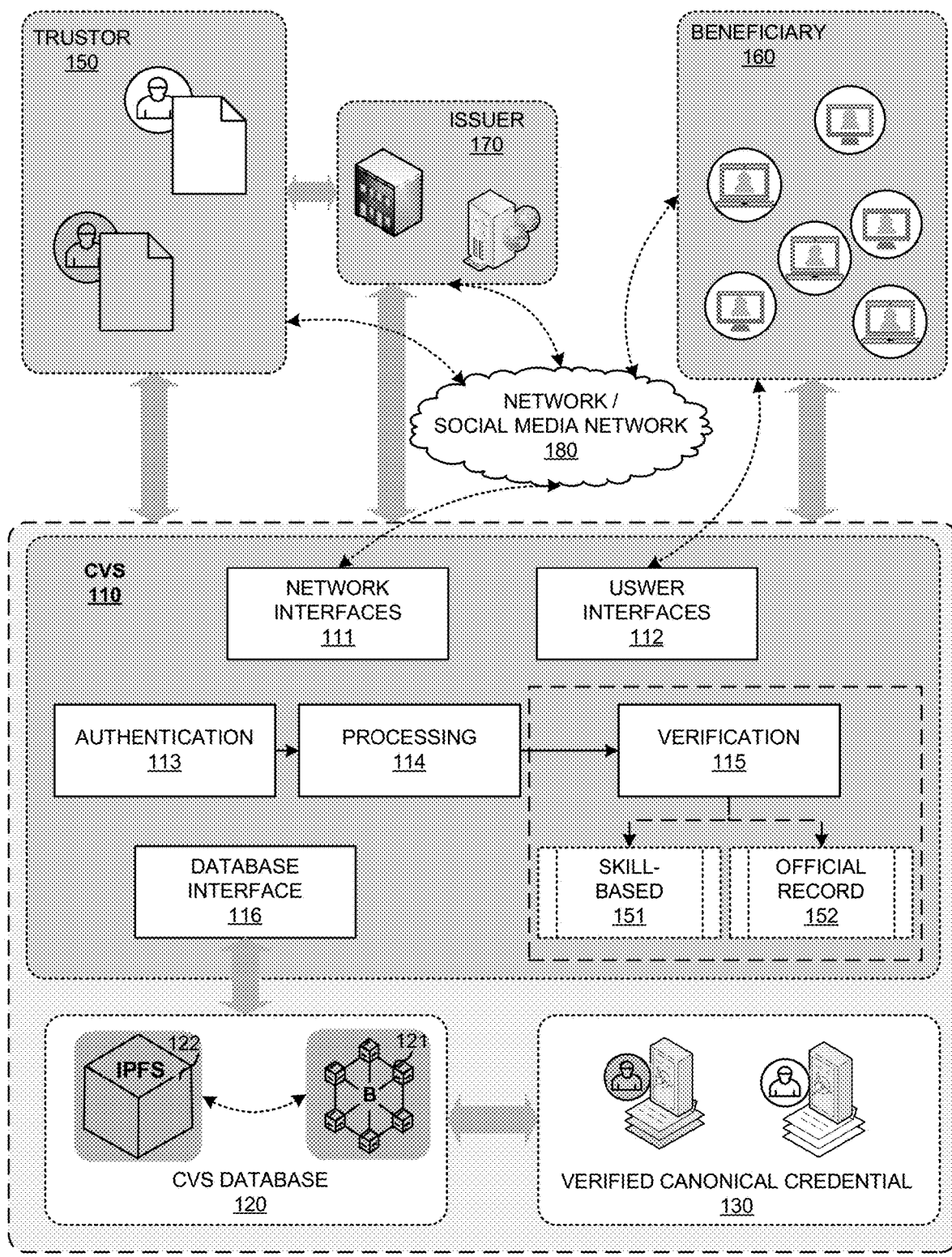
FIG. 1 illustrates exemplary diagrams for a blockchain-based credential verification system (CVS) that performs both skill-based and official-record-based verification with interfaces to the trustors, the beneficiaries, and the issuers in accordance with embodiments of the current invention.

FIG. 1 illustrates exemplary diagrams for a blockchain-based credential verification system (CVS) that performs both skill-based and official-record-based verification with interfaces to the trustors, the beneficiaries, and the issuers in accordance with embodiments of the current invention. A CVS 110 includes one or more network interfaces 111, one or more user interfaces 112, an authentication module 113, a processing module 114, a verification module 115, and a database interface 116. A CVS database 120, which includes a CVS blockchain 121 and an Interplanetary File System (IPFS) 122, interacts with CVS 110. A set of verified canonical credentials for corresponding trustors 130 are stored in CVS data 120. CVS 110 interacts with a trustor 150, a beneficiary 160, an issuer 170, and a network/social media network 180.

Trustor 150 includes a group of trustors who create an account and corresponding trustor record in CVS 110. Trustor 150 interacts with CVS 110 through user interface and/or through network connections. Each trustor in trustor 150 has a trustor identification (ID) associates with the corresponding trustor record. The trustor submits the description of the credentials to CVS 110. The credential descriptions take different formats, including a resume, plain text files, images, and CVS-formatted canonical credential descriptions. CVS 110 processes the submitted credential descriptions from the trustor and generates corresponding canonical credentials for verifications. Trustor 150 also interacts with issuer 170 to obtain corroborations for corresponding credentials, such as certifications and diplomas. These corroborations are submitted to CVS 110.

Beneficiary 160 includes a group of beneficiaries that interacts with CVS 110 through a user interface and/or network connections. A beneficiary submits a request to access one or more authorized trustor records and/or to verify one or more credentials of one or more trustors. In one embodiment, the beneficiary submits a job description to CVS 110. CVS 110 processes the job description and generates a set of canonical credentials required based on the job description. In one embodiment, CVS 110 uses a deep learning-based process to generate the set of canonical credentials based on the job description. The beneficiary does not contact issuer 170 and can obtain verification of candidate's credential instantly through CVS.

In one novel aspect, a blockchain-based credential vault system verifies identities, credentials, and job history and experience of a trustor. Once verified, the information is stored in a blockchain as a single source of truth. The blockchain-based CVS allows the trustor to release identity, credentials, and job history and experiences (JHE) to authorized beneficiaries for the whole credential record or a subset of the verified credentials. In one embodiment, the CVS 110 includes one or more network interfaces 111, an authentication module 113, a processing module 114, a verification module 115, and a database interface 116. The one or more network interfaces 111 connects the system with a social media network. The authentication module 113 authenticates a trustor request from a trustor, wherein a trustor record in the CVS is uniquely identified by a trustor identification in a blockchain-based database of the system. The processing module 114 processes a submission from the authenticated trustor to generate a set of canonical credentials or a set of canonical JHEs, using a recurrent neural network (RNN) model. The verification module 115 performs credential verification for each generated canonical credential in the authenticated trustor submission. Two different types of verifications are supported, including the official-record-based verification 152 and the skill-based verification 151. The database interface 116 appends each verified canonical credential to the trustor record in the blockchain-based database of the CVS.

In one embodiment, CVS database 120 and verified canonical credential 130 are integral parts of the CVS 110. In another embodiment, CVS database and verified canonical credential 130 run on a different platform. In other embodiments, the CVS modules and components run one or more processors or run on different network-connected devices and communicate with each other via predefined network messages. In other embodiments, the functions can be implemented in software, firmware, hardware, or any combinations.

Figure 2:
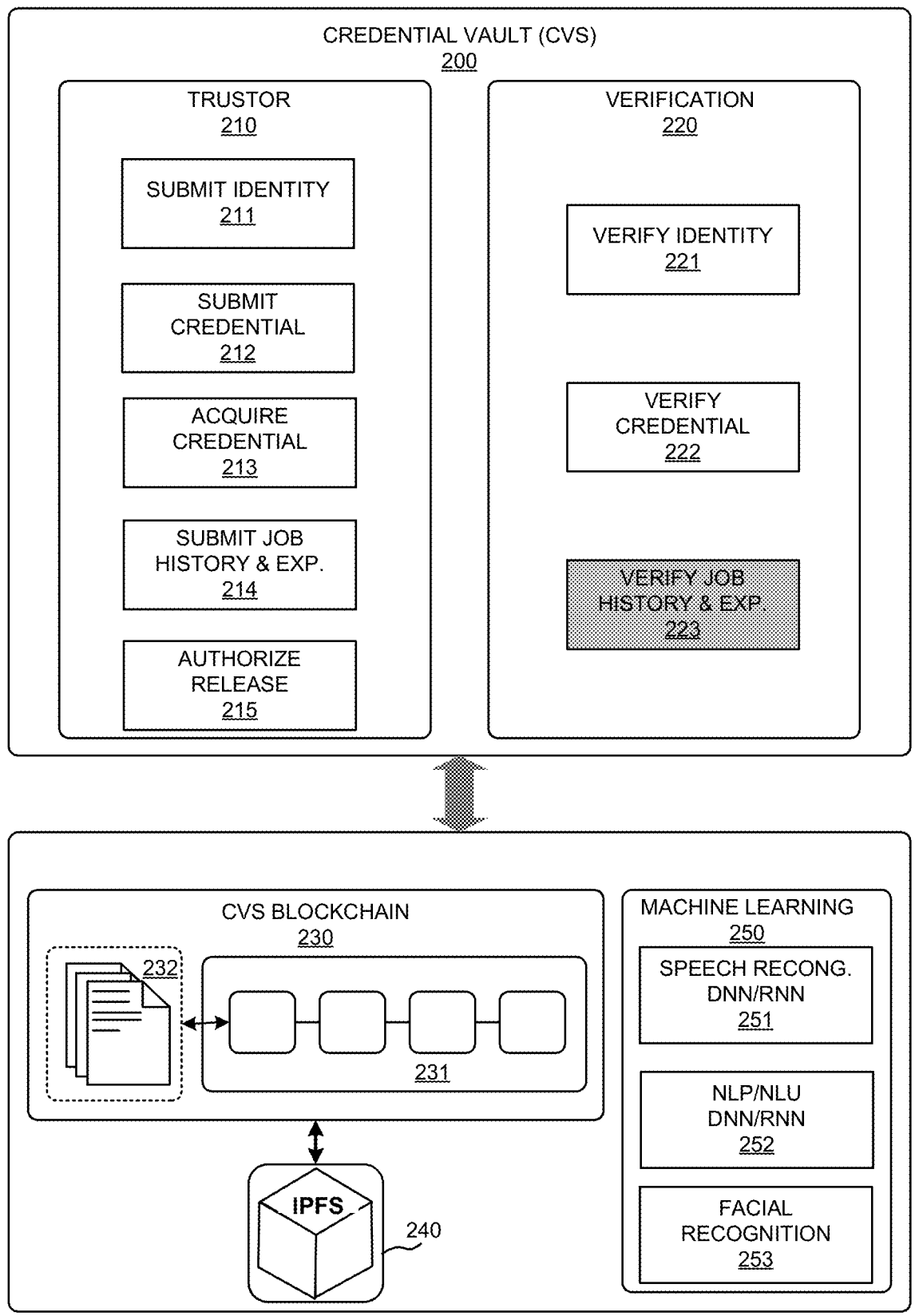
FIG. 2 illustrates an exemplary block diagram of a high-level architecture of the credential vault system in accordance with embodiments of the current invention.

FIG. 2 illustrates an exemplary block diagram of a high-level architecture of the credential vault system in accordance with embodiments of the current invention. Credential Vault System has two major components, namely, a Trustor Module 210 and a Verification Module 220. Trustor Module 210 includes entities for identity submission 211, credential submission 212, credential acquisition 213, job history and experience submission 214, and authorization for release 215. In one embodiment, Trustor Module 210 receives inputs from one or more trustors through a user interface or a network connection. Trustor module 210 processes the trustor inputs and passes them to other components of the CVS. In one embodiment, entity 211 of Trustor Module 210 enables a trustor to submit the identity to CVS for verification. Entity 212 of Trustor Module 210 enables the trustor to submit credentials in possession, such as a photocopy of a diploma. Entity 214 of Trustor Module 210 enables the trustor to submit job history and experience (JHE). In one embodiment, entity 214 processes the JHE submitted by the trustor, in plain language or in a resume, using an RNN process performing a natural language process/natural language understanding (NLP/NLU). Entity 214 generates a set of canonical credentials or canonical JHEs based on the submission from the trustor. In another embodiment, entity 214 provides a formatted form to the trustor to provide the JHE in canonical credential/JHE format. CVS generates canonical credentials for official-record-based credentials and generates canonical JHEs or canonical credentials for skill-based credentials. In one embodiment, entity 213 of Trustor Module 210 provides a credential reference to the trustor to acquire credentials, such as pay and download a digital copy from the issuer. Entity 213 uses data mining to obtain the credential reference for verification based on the submission provided by the trustor.

In one embodiment, each trustor record has a hierarchical setting of authorization for release. The authorization includes a whole record release, individual credential release, searchable level setting, and black/white list. Entity 215 Trustor can further authorize releasing his identity, credentials and job history and experience to one or more beneficiaries. In one embodiment, the levels of authorization are different for different beneficiaries. In another embodiment, the trustor authorizes auto-match based for one or more prospective job openings.

Verification Module 220 has three sub-modules/entities: a Verify Identity entity 221, a Verify Credentials entity 222, and a Verify Job History & Experience entity 223. Verification module 220 performs verification for each canonical credential or canonical JHE of a trustor record. The verification module 220 interacts with the CVS database to append verified credentials to the corresponding trustor record.

A CVS blockchain 230 with an Interplanetary file system (IPFS) 240 is the final storage of the trustor's information. Three Underlying AI machine learning algorithms 250 are used to support specific operations. Module 251 is an automatic speech recognition (ASR) that is based on a recurrent network (RNN) deep learning model. The RNN is trained and used to convert speech to text. Module 252 is yet another RNN deep learning model that is trained and used to perform NLP/NLU to understand the text. Finally, a Facial Recognition 253 based on deep neural network (DNN)/convolutional neural network (CNN) is trained and used for face recognition. These tools are used to automate the verification processes.

Job history and experience (JHE) is the most complicated and trivial process. It is also the least efficient process in background checks on trustor. In one novel aspect, skill-based credentials, such as those described in JHE, are evaluated using social media search, peer network affirmation, and robotic contacts. The skill-based credential evaluation procedure offers a multi-faceted approach to offer an efficient and holistic background check.

Figure 3:
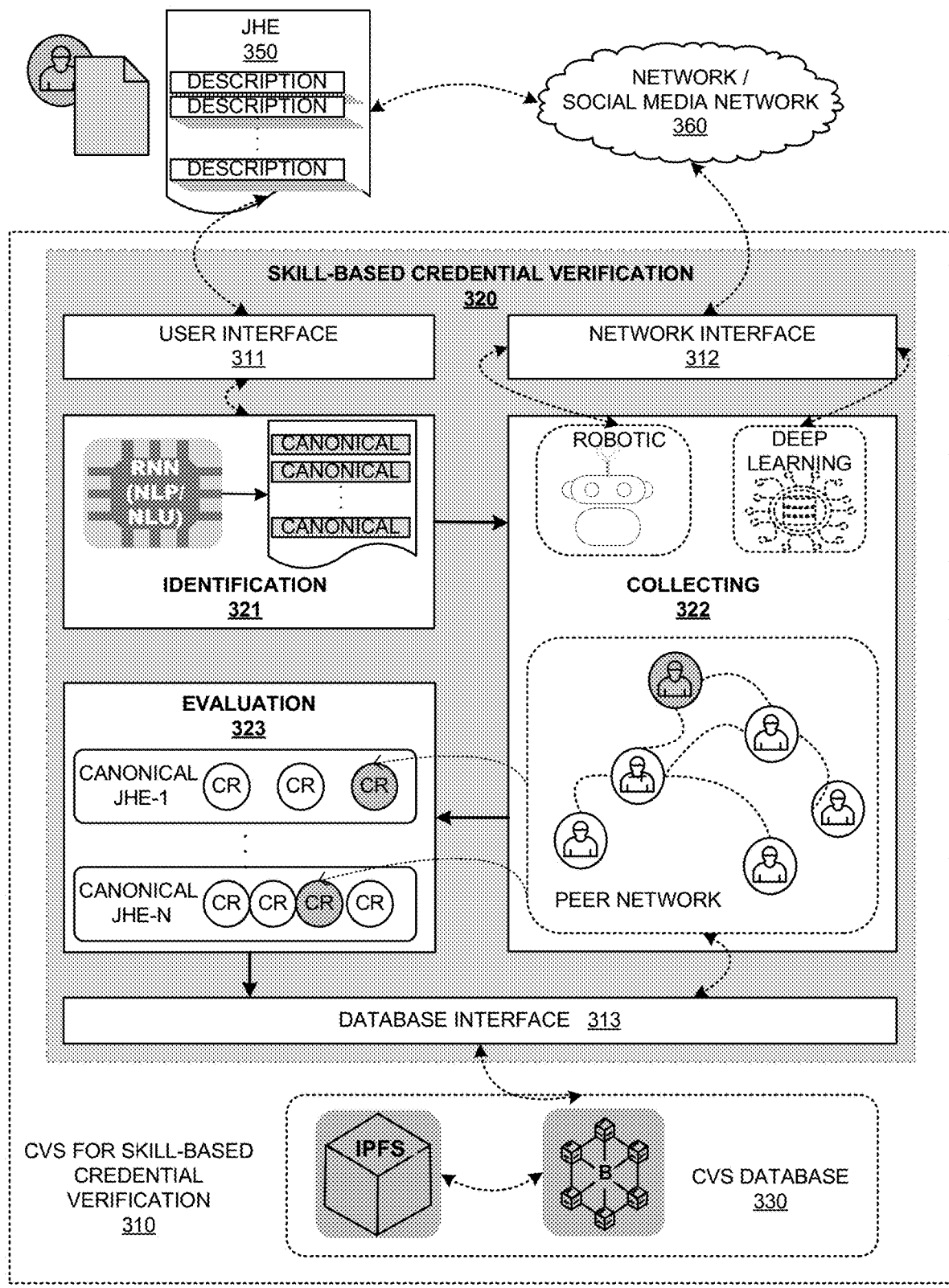
FIG. 3 illustrates exemplary diagrams for skill-based credential identification procedure with a blockchain-based database in accordance with embodiments of the current invention.

FIG. 3 illustrates exemplary diagrams for skill-based credential identification procedure with blockchain-based database in accordance with embodiments of the current invention. A skill-based credential verification system 320 is part of CVS 310 for skill-based credential verification. System 320 includes major processing modules, including an identification module 321, a collecting module 322, and an evaluation module 323. System 320 also include a user interface module 311, one or more network interface modules 312, and a database interface module 313, which interacts with a CVS database 330. System 320 receives JHE 350 from a trustor through user interface module 311 and/or network interface module 312. System 320 also interacts with a network/social media network 360 through one or more network interface 312. In one embodiment, one or more network interfaces 312 connects the system with a social media network. Identification module 321 identifies a set of skill-based canonical JHEs for a trustor based on a description of job history and experience (JHE) of the trustor using a recurrent neural network (RNN) model with natural language process/natural language understanding (NLP/NLU), wherein a trustor record in the CVS is uniquely identified by a trustor identification in a blockchain-based database of the CVS. Collecting module 322 collects one or more corroborations for each canonical JHE by the system. Evaluation module 324 evaluates each canonical JHE based on the collected one or more corroborations using a deep learning model to verify the corresponding canonical JHE. Database interface module 313 appends each verified canonical JHE to the trustor record in a blockchain-based database of the system.

In one embodiment, identification module 321 receives JHE 350 in free-text format from the trustor. Identification module 321 processes the JHE using RNN with NLP/NLU and generates a set of canonical JHEs. In another embodiment, the RNN process generates a set of attributes based on each JHE items. These attributes associate with one or more canonical JHEs. Collecting module 322 receives the generated canonical JHEs and/or attributes of each JHE items. Collecting module 322 uses one or more collecting procedures to collect relevant corroborations for each canonical JHE and/or attributes of each JHE items. The collecting procedures include a robotic procedure that contacts the issuers or parties of record, a deep learning/data mining procedure that searches the trustor's professional social media network, and a peer network inquiry procedure that obtains affirmations from trustor's verified peers. In one embodiment, the peer network inquiry obtains the affirmation through the CVS database inquiries. In another embodiment, broadcast messages are sent to the trustor's peer network in the CVS database for affirmation.

In one embodiment, social media network search is further used for trustor ID verification. In addition to the image extraction procedure, the social media search of the trustor's image is to assist the facial recognition for trustor ID verification.

Figure 4:
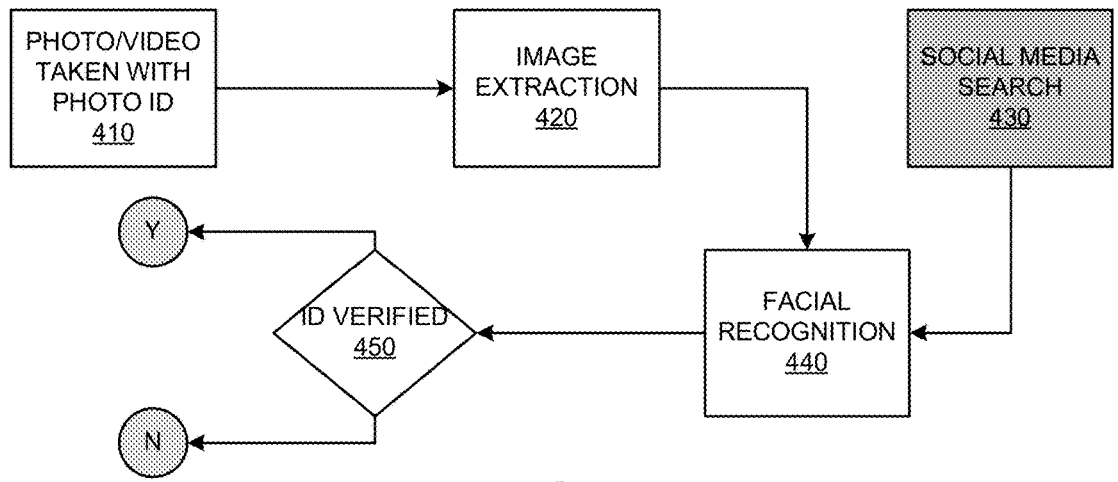
FIG. 4 illustrates an exemplary flow diagram for the trustor ID verification procedure in accordance with embodiments of the current invention.

FIG. 4 illustrates an exemplary flow diagram for the trustor ID verification procedure in accordance with embodiments of the current invention. To ensure the identity of a trustor, CVS uses multi-faceted verification methods. At process 410, Trustor's identity, such as the government-issued ID card, personal information, along with a self-introduction video, is submitted to CVS. A selfie of the trustor along with his official photo ID card (410) using a device registered in the CVS, which is associated with the trustor's account. In one embodiment, photos and videos from social media of trustor are collected at process 430. In process 420, an image extraction algorithm such as image segmentation is used to extract trustor's face in the selfie, the self-introduction video, and the photo on the government-issued ID card, in addition to trustor's face in social media collected on him. These images will be passed on to 440, which uses the Facial Recognition deep learning model. The facial recognition model will authenticate the trustor and the submission by the trustor. In one embodiment, the self-introduction video and audio are processed and stored in CVS as a part of trustor account, such as log-in credentials through facial recognition and/or voice recognition.

Figure 5:
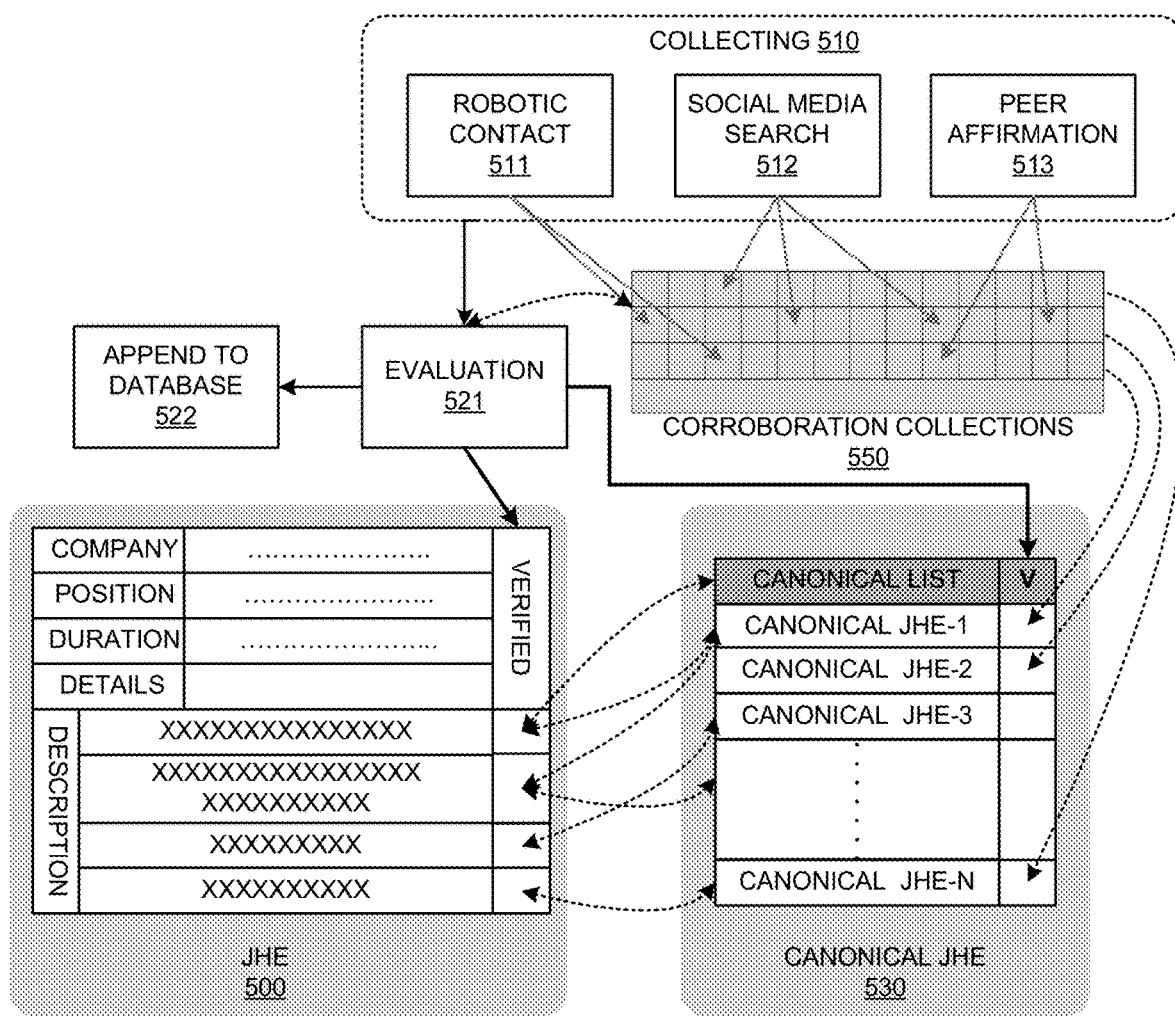
FIG. 5 illustrates exemplary top-level diagrams for the collecting and verification procedures for skill-based credential verification using robotic contact, social media search, and peer affirmation in accordance with embodiments of the current invention.

FIG. 5 illustrates exemplary top-level diagrams for the collecting and verification procedures for skill-based credential verification using robotic contact, social media search and peer affirmation in accordance with embodiments of the current invention. A JHE 500, which includes one or more description items, is processed to generate a list canonical JHEs 530. In one embodiment, an RNN model with NLP/NLU is used to generate list 530 based on JHE 500. In other embodiments, attributes of each items of JHE 500 is generated. Each attribute is mapped to one or more canonical JHEs. Each canonical JHE of 530 is mapped to one or more description items of the JHE. Collecting 510 collects one or more corroborations for each canonical JHE in list 530. The collected corroborations are stored in the corroboration collection 550. In one embodiment, corroboration collection 550 is a matrix where each entry is a corroboration value. Evaluation module 521 evaluates each canonical JHE of 530 based on corresponding corroborations collected in 550. In one embodiment, a verified/not verified result is generated for each canonical JHE. In another embodiment, a scaled result is generated using a predefined algorithm based on corresponding corroborations collected in 550. In other embodiment, evaluation module 521 further generates a verification result for each JHE item based on corresponding canonical JHEs associated with each JHE items. In one embodiment, both the verified canonical JHEs and the verified JHE items are appended to the trustor record in the CVS database at step 522.

Figure 6A:
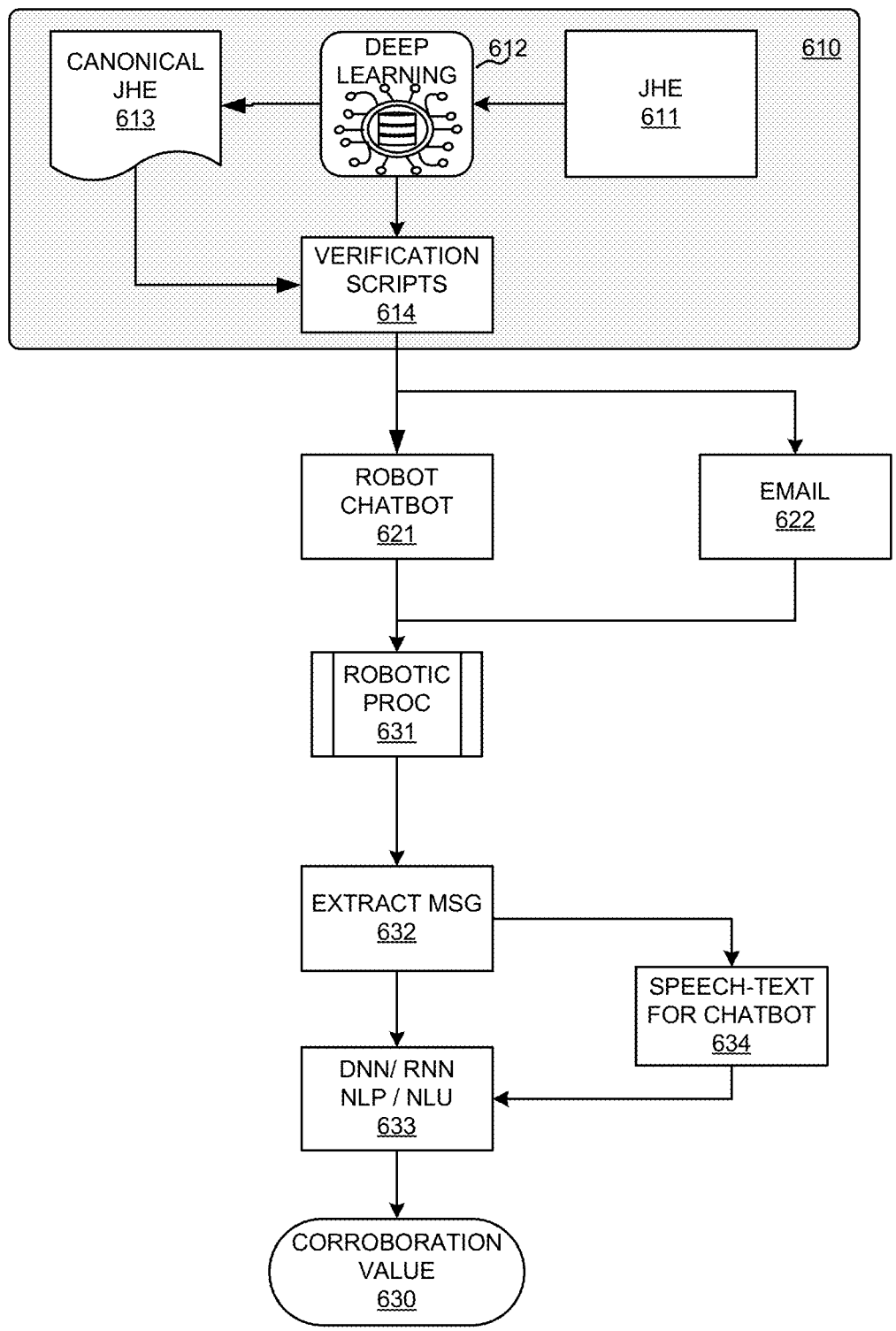
FIG. 6A illustrates exemplary diagrams for robotic contact JHE verification with issuers/record holders in accordance with embodiments of the current invention.
Figure 6B:
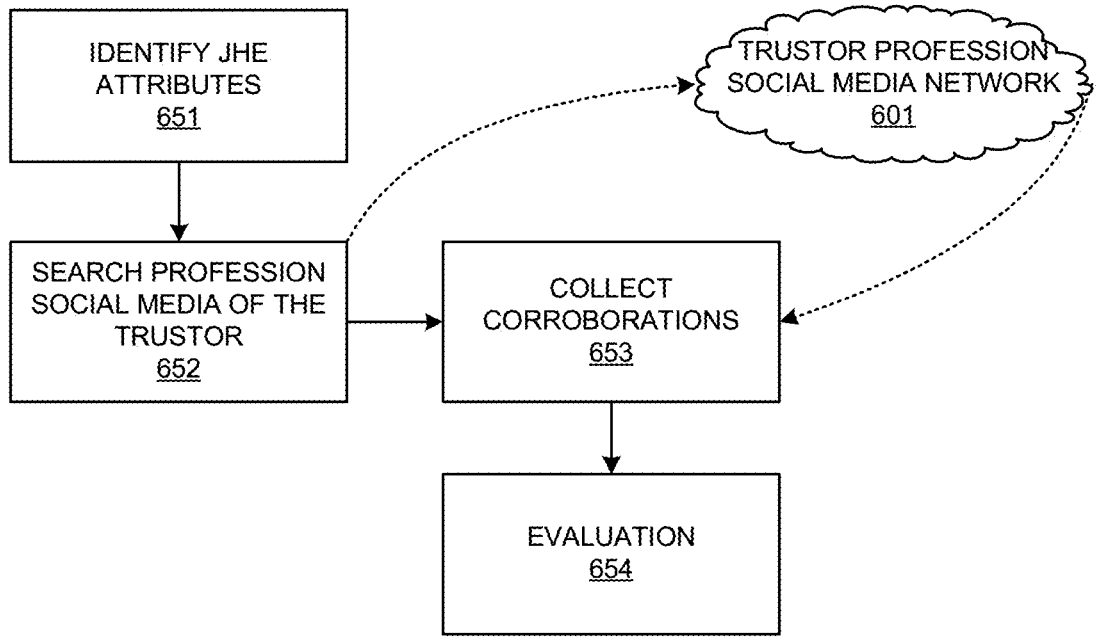
FIG. 6B illustrates exemplary diagrams for JHE verification using social media search in accordance with embodiments of the current invention.
Figure 6C:
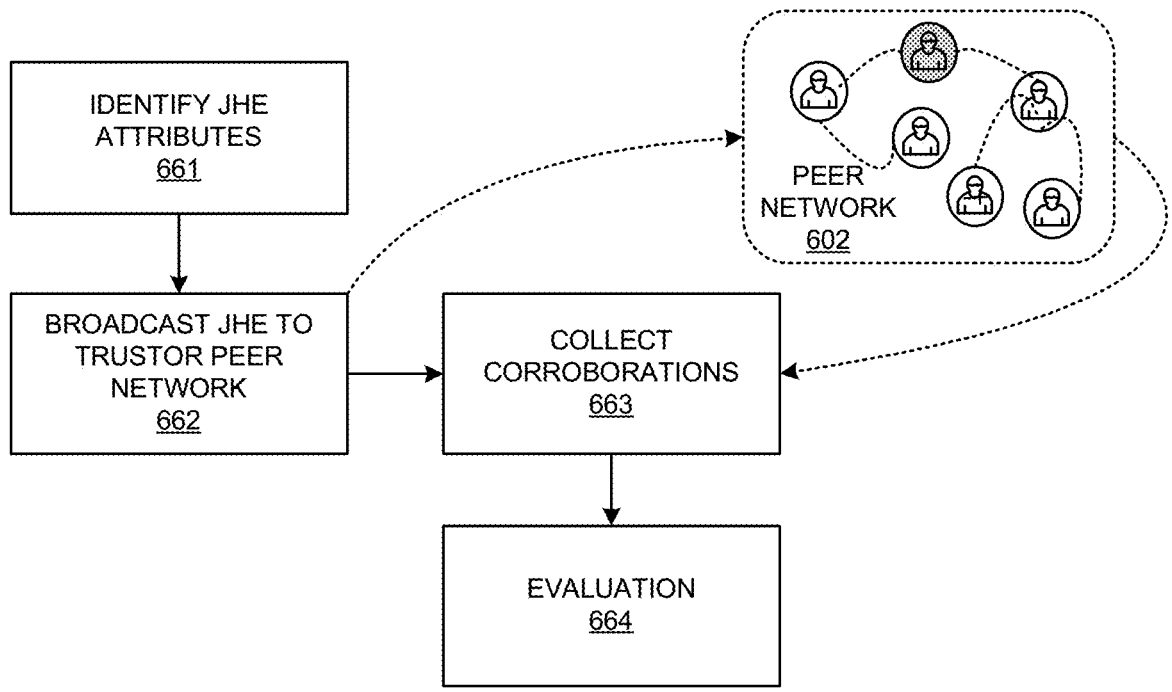
FIG. 6c illustrates exemplary diagrams for JHE verification using peer affirmation in accordance with embodiments of the current invention.

In one novel aspect, one or more verification procedures are used to verify a JHE based on predefined criteria. The JHE procedures includes a robotic contact verification procedure, a social media search procedure, and a peer affirmation procedure. FIGS. 6A, 6B, and 6C illustrate in detail of the above JHE verification procedures.

FIG. 6A illustrates exemplary diagrams for robotic contact JHE verification with issuers/record holders in accordance with embodiments of the current invention. When it is necessary to contact the issuer for verification, JHE verification provides robotic verifications for identified canonical JHEs. In one embodiment, process 610 creates one or more verification scripts for chatbot voice calls and/or emails. One or more identified JHE are identified at process 613. The JHEs include additional information such as years of employment, duration, and positions held. Process 611 takes the JHE details and additional information as inputs to a deep learning model 612, which, in turn, yields appropriate Canonical JHE 613. Process 614 generates verification scripts for each canonical JHE using deep learning model 612. JHE verification determines one or more verification methods for the robotic JHE verification, including a robot chatbot 621 and/or an email 622. Robotic procedure 631 enables the robotic verification procedure based on the generated script. Email responses and/or chatbot audio responses will be extracted by process 632 and analyzed by process 633. If the responses are phone messages or chatbot dialogs, the audio is converted to text by the speech-to-text RNN model at step 634. The converted text is then analyzed by 633, where the RNN performs NLP/NLU on the text. Results from both email and/or audio are consolidated. The verification result, either verified or denied, are appended to the request record of the CVS. The set of corroboration verification values/results are generated at step 630.

FIG. 6B illustrates exemplary diagrams for JHE verification using social media search in accordance with embodiments of the current invention. Social Media Search is used to search on trustor's professional social media. Process 651 is to extract the job history attributes, for instance, industry and skills. Process 652 identifies professional social media networks 601 and crawls over professional social media sites. Process 653 collects evidence/corroborations that are related to the JHE attributes. Process 654 conducts an in-depth analysis of the trustor's professional social media presence. For instance, the quality of his comments, numbers of followers, and people he follows, etc. The results of the verification at process 654 contain the evidence, the date, picture of the evidence such as conference presentation, invited talks, videos and industry recognition and so on. Each evidence/corroboration is collected and put in a corroboration collection classified by each canonical JHE and/or attributes. The collected corroborations are combined with other corroborations generated by other JHE verification procedures to generate a holistic view of each identified canonical JHE. In one embodiment, a holistic evaluation/verification is generated for each JHE item based on associated canonical JHEs.

FIG. 6c illustrates exemplary diagrams for JHE verification using peer affirmation in accordance with embodiments of the current invention. In one embodiment, the JHE is verified through peer affirmation. CVS is essentially a member-only community. It is transparent and trustworthy within the community. Peer Affirmation is to let CVS trustors validate JHE of another trustor. Process 661 extracts the job history attributes, for instance, industry and skills. Process 662 identifies a group of peers of the trustor. In one embodiment, the JHE, or part of the JHE, with permission is groupcasted to the identified peers for affirmation. Process 663 collects evidences/corroborations that are related to the JHE attributes. Process 664 conducts evaluation and analysis for one or more responses from one or more peers. The results of the verification at process 654 contain the evidence, the date, picture of the evidence such as conference presentation, invited talks, videos and industry recognition and so on. Each evidence/corroboration is collected and put in a corroboration collection classified by each canonical JHE and/or attributes.

Figure 7:
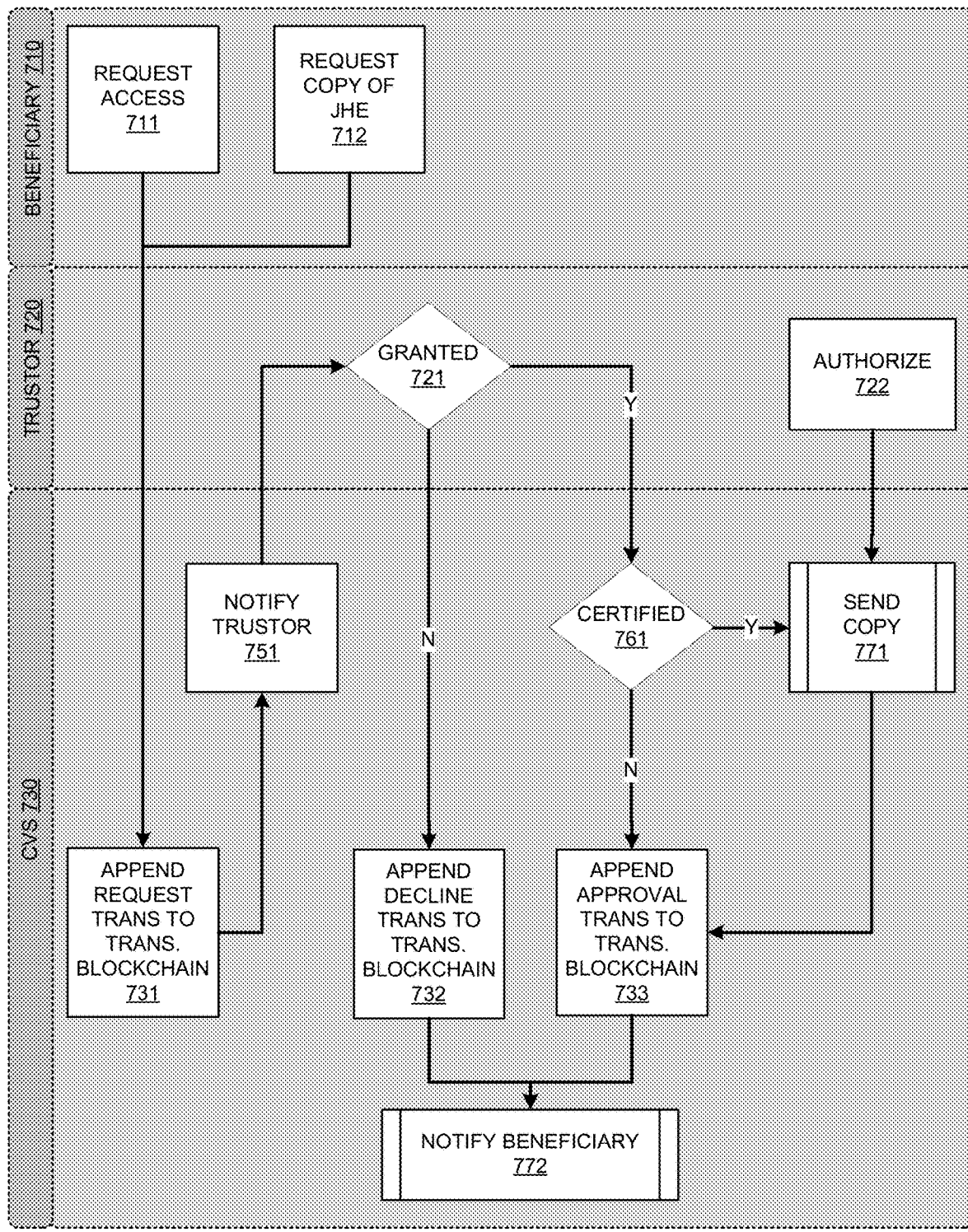
FIG. 7 illustrates exemplary diagrams for trustor record and/or credential release authorization process using the CVS in accordance with embodiments of the current invention.

FIG. 7 illustrates exemplary diagrams for trustor record and/or JHE release authorization process using the CVS in accordance with embodiments of the current invention. Trustor can authorize the release of his credentials and JHE to a beneficiary. CVS offers two services: (1) authorize beneficiary to access trustor's profile if the beneficiary is given the privilege, and (2) send beneficiary "notarized" or certified copy of JHEs. Sending a copy of the JHE can be initiated by both the beneficiary and the trustor. If it is initiated by the beneficiary, it needs to have the trustor's approval. On the other hand, trustor can directly authorize sending copy of JHE to beneficiary. For example, a trustor authorizes CVS to send his conference paper to a beneficiary.

A beneficiary 710 can request access to one or more trustor records by sending an access request in process 711. Beneficiary 710 can also request a copy of the JHE of the trustor in process 712. Upon receiving the one or more requests from beneficiary 710, the CVS identifies the requested one or more trustors and stores corresponding request transaction in the request record of each corresponding trustor in the CVS blockchain database. Upon determining the request from the beneficiary is authorized, the CVS sends the certified copy of the JHE to the beneficiary in process 771.

Upon receiving request from the beneficiary, CVS 730 first appends the request transaction to the blockchain at process 731. At process 751, CVS 730 notifies trustor 720 on the request. In one embodiment, the notification process 751 checks the trustor record with access/privacy settings. In another embodiment, the CVS processes the request from the beneficiary and detects authorization information. In yet another embodiment, a notification or a response is received from the trustor 720 regarding the request from the beneficiary. CVS 730 analyzes one or more pieces of access information for the request and determines if the request is granted or denied as in process 721. If CVS 720 determines that the beneficiary's request is denied, CVS 720 appends the request decline transaction to blockchain at step 732 and sends notifications the beneficiary at step 772. If trustor 720 determines the beneficiary's request is granted, and if the request is to access trustor's credential in CVS, the approval request will be appended to the blockchain at step 733, and CVS 720 sends notifications to the beneficiary at step 772. If the approved request is for a certified copy of credential, CVS 720 sends the certified copy to beneficiary and appends a send transaction to blockchain at step 771.

Figure 8A:
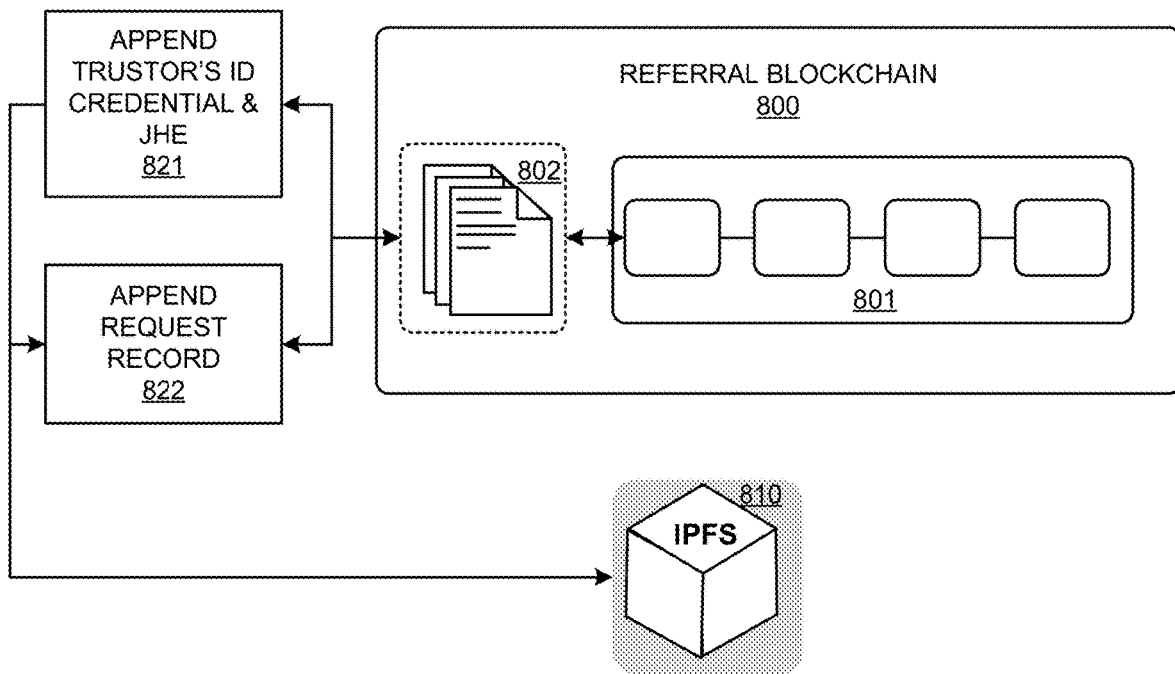
FIG. 8A illustrates an exemplary block diagram of the credential vault blockchain database with IPFS in accordance with embodiments of the current invention.

FIG. 8A illustrates an exemplary block diagram of the credential vault blockchain database with IPFS in accordance with embodiments of the current invention. CVS comprises two major storage technologies, the blockchain distributed ledger 800 and a private Interplanetary file system (IPFS) 810. IPFS is a protocol and peer-to-peer network for storing and sharing data in a distributed file system. IPFS uses content-addressing to identify each file uniquely. It offers decentralization and tamper-proof storage with cryptography. In CVS, the ledger 801 is to maintain the trustor's identity, his assets and requests from both trustor and beneficiary. Smart contract 802 is built upon the distributed ledger 801. Since distributed ledger allows for multiparty and shared use, distributed ledgers can be equipped with multiparty business logic, which is more commonly referred to as 'smart contract'. The request 822 from beneficiary to access a trustor and the corresponding assets are maintained in the request record. Trustor's identity data, including corresponding personal information, ID card photocopy, selfie, and introduction video is managed by asset record procedure 821.

Module 821 comprises Append Identity, Append Credential, and Append JHE. When trustor's identity is verified, the module will store the identity file such as the photocopy of his official ID card to IPFS 810. IPFS 810 returns a hash address of his office ID card. The hash address is the Trustor ID that is stored in the ledger of the blockchain. Other supportive documents such as selfie, introduction video and so on are also stored in IPFS 810. In return, their hash addresses are stored in the blockchain 800 as asset IDs. For each verified credential, credential information, such as the photocopies of the diploma, the certificate, are stored to IPFS 810. Corresponding hash addresses are the asset IDs. Similarly, for job history and experience, information for JHE are stored in IPFS 810. The hash addresses of each JHE credential is the asset ID. Module 822 records beneficiary request records in the CVS database. Module 822 performs appending request transaction, appending request decline, appending request approval, and appending send credential.

Figure 8B:
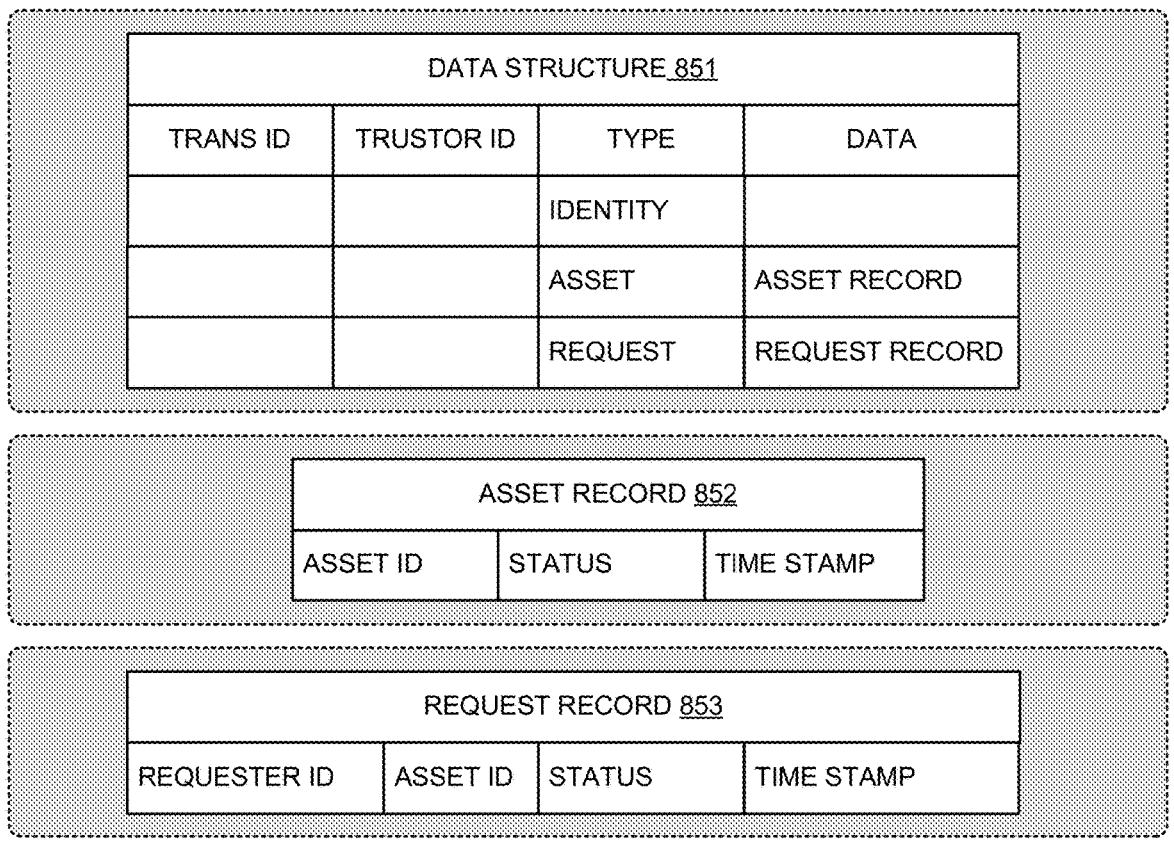
FIG. 8B illustrates exemplary block diagrams of data structures of asset record and request record in the CVS database in accordance with embodiments of the current invention.

FIG. 8B illustrates exemplary block diagrams of data structures of asset record and request record in the CVS database in accordance with embodiments of the current invention. The blockchain ledger is the linked list of transactions that support CVS. Trustor's data structures 851 support different types of entries. Beneficiary's identity and profile can be included as needed. Depending on the type of transactions, such as identity, asset (e.g. credentials and JHEs), and request, the structures will contain the relevant data. An exemplary asset record 852 includes the asset ID, the status and the time stamp. The asset ID is the hash address of the asset data stored in the IPFS. An exemplary request record 853 includes the request ID, the asset ID, the status and the time stamp. Requester ID is the beneficiary ID.

Figure 9:
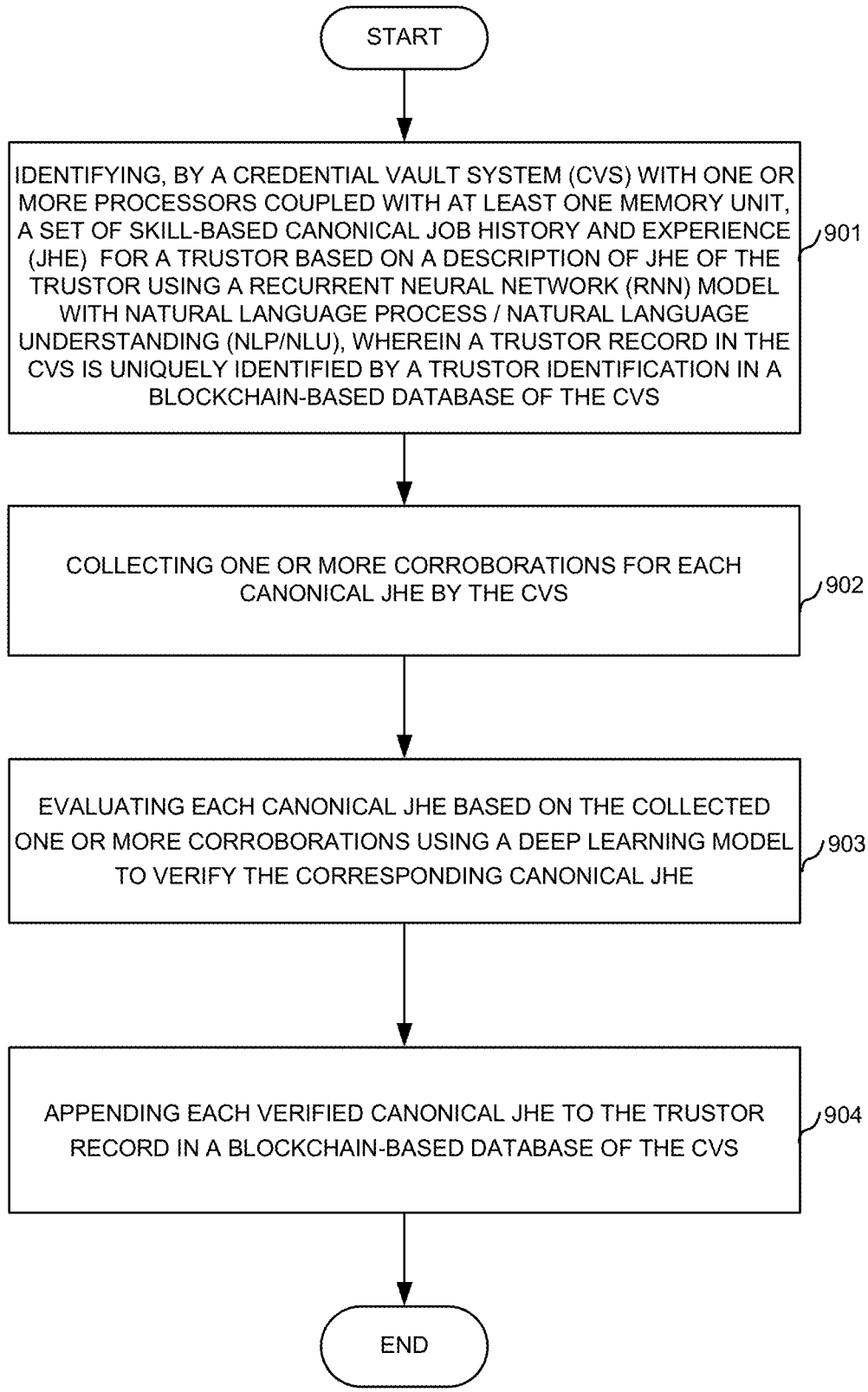
FIG. 9 illustrates an exemplary flow chart for the credential verification procedure using the credential vault system in accordance with embodiments of the current invention.

FIG. 9 illustrates an exemplary flow chart for the credential verification procedure using the credential vault system in accordance with embodiments of the current invention. At step 901, the CVS identifies a set of skill-based canonical credentials for a trustor based on a description of job history and experience (JHE) of the trustor using a recurrent neural network (RNN) model with natural language process/natural language understanding (NLP/NLU), wherein a trustor record in the CVS is uniquely identified by a trustor identification in a blockchain-based database of the CVS. At step 902, the CVS collects one or more corroborations for each canonical JHE by the CVS. At step 903, the CVS evaluates each canonical JHE based on the collected one or more corroborations using a deep learning model to verify the corresponding canonical JHE. At step 904, the CVS appends each verified canonical JHE to the trustor record in a blockchain-based database of the CVS.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
   identifying, by a credential vault system (CVS) with one or more processors coupled with at least one memory unit, a set of skill-based canonical job history and experience (JHE) for a trustor based on a description of JHE of the trustor using a recurrent neural network (RNN) model with natural language process/natural language understanding (NLP/NLU), wherein a trustor record in the CVS is uniquely identified by a trustor identification in a blockchain-based database of the CVS;
   collecting one or more corroborations for each canonical JHE by the CVS;

evaluating each canonical JHE based on the collected one or more corroborations using a deep learning model to verify the corresponding canonical JHE; and appending each verified canonical JHE to the trustor record in a blockchain-based database of the CVS.

2. The method of claim 1, wherein the corroborations for each canonical JHE are collected from a social media network.

3. The method of claim 2, further comprising:
identifying search attributes for each canonical JHE using a deep learning model;
identifying trustor-related professional social media resources; and
collecting the corroborations based on search results of the identified search attributes on the identified social media resources.

4. The method of claim 1, wherein the corroborations for each canonical JHE are collected from one or more member trustors in the CVS.

5. The method of claim 4, further comprising:
identifying a group of member trustors in the CVS based on the trustor record;
groupcast a verification request with information of the trustor to the identified group of member trustors for verification;
analyzing one or more responses to the verification request from one or more member trustors; and
generating one or more corroborations for one or more corresponding canonical JHE of the trustor.

6. The method of claim 1, wherein the evaluating of each canonical JHE generates an evaluation report, and wherein the evaluation report is appended in the blockchain-based database of the CVS.

7. The method of claim 1, further comprising authenticating the trustor before appending the verified canonical JHE to the blockchain-based database of the CVS.

8. The method of claim 7, wherein the authenticating the trustor involves:
obtaining a selfie of the trustor alongside an official photo ID;
collecting images of the trustor from a social media network; and
performing facial recognition of the received selfie with deep learning model based on the images collected.

9. The method of claim 1, wherein the blockchain-based database comprises a credential vault blockchain and a private interplanetary file system (IPFS).

10. The method of claim 9, wherein a canonical JHE report is stored in the private IPFS and an asset ID of the canonical JHE report is appended to the credential vault blockchain.

11. A system for, comprising:
one or more network interfaces that connects the system with a social media network;
an identification module that identifies a set of skill-based canonical job history and experience (JHE) for a trustor based on a description of JHE of the trustor using a recurrent neural network (RNN) model with natural language process/natural language understanding (NLP/NLU), wherein a trustor record in the CVS is uniquely identified by a trustor identification in a blockchain-based database of the CVS;
a collecting module that collects one or more corroborations for each canonical JHE by the system;
an evaluation module that evaluates each canonical JHE based on the collected one or more corroborations using a deep learning model to verify the corresponding canonical JHE; and
a database interface module that appends each verified canonical JHE to the trustor record in a blockchain-based database of the system.

12. The system of claim 11, wherein the corroborations for each canonical JHE are collected from a social media network.

13. The system of claim 12, further comprising: a social media module that identifies search attributes for each canonical JHE using a deep learning model, identifies trustor-related professional social media resources, collects the corroborations based on search results of the identified search attributes on the identified social media resources.

14. The system of claim 11, wherein the corroborations for each canonical JHE are collected from one or more member trustors in the system.

15. The system of claim 14, further comprising: a peer module that identifies a group of member trustors in the CVS based on the trustor record, groupcasts a verification request with information of the trustor to the identified group of member trustors for verification, analyzes one or more responses to the verification request from one or more member trustor, and generates one or more corroborations for one or more corresponding canonical JHE of the trustor.

16. The system of claim 11, wherein the evaluating of each canonical JHE generates an evaluation report, and wherein the evaluation report is appended in the blockchain-based database of the system.

17. The system of claim 11, further comprising a trustor module that authenticates the trustor before appending the verified canonical JHE to the blockchain-based database of the system.

18. The system of claim 17, wherein the authenticating the trustor involves:
obtaining a selfie of the trustor alongside an official photo ID;
collecting images of the trustor from a social media network; and
performing facial recognition of the received selfie with deep learning model based on the images collected.

19. The system of claim 11, wherein the blockchain-based database comprises a credential vault blockchain and a private interplanetary file system (IPFS).

20. The system of claim 19, wherein a canonical JHE report is stored in the private IPFS and an asset ID of the canonical credential report is appended to the credential vault blockchain.

* * * * *